United States Patent [19]
Rutz et al.

[11] Patent Number: 6,101,739
[45] Date of Patent: Aug. 15, 2000

[54] METHOD AND APPARATUS FOR TREATING EXHAUST GASES OF THERMAL DRYING PROCESSES AND PARTICULARLY PROCESSES FOR DRYING SEWAGE SLUDGE

[75] Inventors: Andreas Rutz, Lindau; Karsten Resch, Weissensberg, both of Germany

[73] Assignee: Lindauer Dornier Gesellschaft, Lindau, Germany

[21] Appl. No.: 09/150,357

[22] Filed: Sep. 9, 1998

[30] Foreign Application Priority Data

Sep. 11, 1997 [DE] Germany ............... 197 39 864

[51] Int. Cl.[7] ............................................. F26B 3/08
[52] U.S. Cl. ............................................... 34/373
[58] Field of Search ........................ 34/337, 338, 359, 34/362, 372, 373, 380, 381; 210/137, 199, 205, 609, 195.3; 201/31; 209/2, 3, 10, 11; 432/15; 110/222, 345

[56] References Cited

U.S. PATENT DOCUMENTS

| | | | |
|---|---|---|---|
| 4,042,494 | 8/1977 | Stoyer | 210/626 |
| 4,062,770 | 12/1977 | Kneer | 210/613 |
| 4,172,781 | 10/1979 | Walk et al. | 210/626 |
| 4,226,668 | 10/1980 | Ferguson | 159/4 A |
| 4,654,144 | 3/1987 | Sharkey et al. | 210/631 |
| 5,215,670 | 6/1993 | Girovich | 34/378 |
| 5,364,529 | 11/1994 | Morin et al. | 210/608 |
| 5,373,647 | 12/1994 | Bernes et al. | 34/382 |
| 5,428,904 | 7/1995 | Rutz | . |
| 5,557,873 | 9/1996 | Lynam et al. | 34/379 |
| 5,695,532 | 12/1997 | Johnson et al. | 48/203 |

FOREIGN PATENT DOCUMENTS

| | | |
|---|---|---|
| 393379 | 10/1991 | Austria . |
| 0593887 | 7/1995 | European Pat. Off. . |
| 2117746 | 10/1972 | Germany . |
| 3923020 | 1/1991 | Germany . |
| 4013761 | 10/1991 | Germany . |
| 4016100 | 11/1991 | Germany . |
| 49-47251 | 5/1974 | Japan . |
| 57-33714 | 2/1982 | Japan . |
| 1-293119 | 11/1989 | Japan . |

*Primary Examiner*—Stephen Gravini
*Attorney, Agent, or Firm*—W. F. Fasse; W. G. Fasse

[57] ABSTRACT

In a method of drying a moist bulk material, such as sewage sludge, and treating the malodorous moisture-laden gas resulting from the drying process, the moisture-laden gas is introduced into waste water contained in a waste water clarifying basin of a waste water treatment plant. A system for carrying out the method includes a drying apparatus and at least one waste water basin of a waste water treatment plant, connected so that the moisture-laden gas emitted from the drying apparatus can be introduced, for example through an aerator, into the waste water. Thereby, the gas is cooled, demoisturized and deodorized, and moisture and volatile components are condensed and/or dissolved out of the gas into the waste water. The waste water is beneficially oxygenated, heated, and enriched with organic substances.

13 Claims, 1 Drawing Sheet

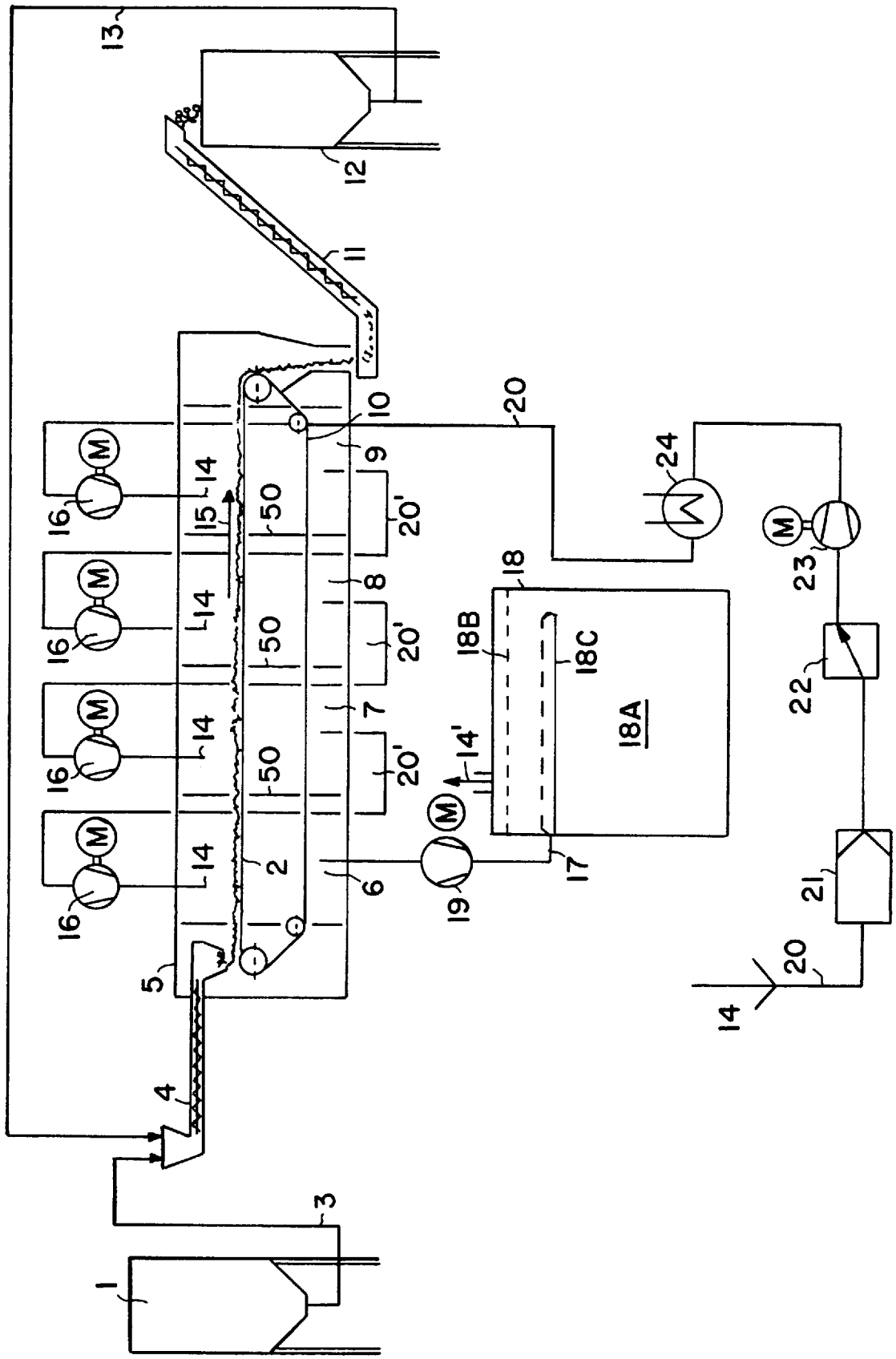

METHOD AND APPARATUS FOR TREATING EXHAUST GASES OF THERMAL DRYING PROCESSES AND PARTICULARLY PROCESSES FOR DRYING SEWAGE SLUDGE

PRIORITY CLAIM

This application is based on and claims the priority under 35 U.S.C. §119 of German Patent Application 197 39 864.2, filed on Sep. 11, 1997.

FIELD OF THE INVENTION

The invention relates to a method for treating the exhaust gases of thermal drying processes, and particularly processes for drying sewage sludge in sludge drying apparatuses, wherein a tempered process gas flow is used to extract moisture, except for a remaining residual moisture content, out of the sewage sludge.

BACKGROUND INFORMATION

Various processes are known for drying moist bulk materials and particularly sewage sludge. It has long been problematic, however, to handle or treat the moisture-laden exhaust gases that result from the drying processes. These exhaust gases, in addition to being hot and moisture-laden, are usually malodorous and laden with environmentally damaging or even toxic substances.

For this reason, the discharge of these exhaust gases directly into the atmosphere without some form of processing is to be avoided.

Published European Patent Document 0,593,887 and corresponding U.S. Pat. No. 5,428,904 (Rutz) disclose a method for thermally drying pasty materials and particularly sewage sludge that is preferably in pelletized form. In the disclosed method, moisture is extracted from the sewage sludge, except for a remaining residual moisture content, by means of a flow of a drying gas at a temperature below the mobilization or activation temperature of sewage constituent substances or additive substances present in the sludge. In a first gas flow circuit, the moisture is extracted from the drying gas by means of a gas demoisturizer, and the resulting dried gas is recirculated into the dryer. In a second gas flow circuit, the moisture that has been absorbed or taken up by the gas demoisturizer is extracted therefrom by a flow of heated regeneration gas. The tempered and moisture-laden regeneration gas is then exhausted, either through a deodorizing apparatus or directly, into the atmosphere.

While the disclosed method and apparatus according to U.S. Pat. No. 5,428,904 have proved suitable for the intended purposes, it has been found that the separate operations and gas flow circuits for drying the process gas and then for drying the gas demoisturizer, as well as for cleaning the regeneration gas, require relatively high efforts with regard to the necessary equipment and control technology. Furthermore, carrying out the method in such a plant requires a considerable operating and maintenance effort and relatively high operating costs for the operator of the plant.

Austrian Patent 393,379 (Curtius) discloses a method for thermally treating, and particularly drying, a flowable water-containing bulk material, and particularly waste water sludge. In this known method, the previously compacted or granulated material is conveyed through a fluidized bed of a closed fluidized bed apparatus, in which the bulk material is heated by means of installed heating surfaces for producing an inert gas, which essentially comprises water vapor or steam. The fluidized bed is fluidized exclusively by means of this developed gas. The exhaust gases in excess of the gas needed for ventilating and fluidizing the bulk material are conveyed out of the contact fluidized bed dryer through a branch pipe. A cyclone separator or a filter is installed in this branch pipe for cleaning the exhaust gases, and a condenser is installed in this branch pipe for heat recovery. Carrying out the hygenization, i.e. cleaning, and filtering of the exhaust gas requires a relatively high effort with regard to the necessary equipment and control technology, and simultaneously necessitates a certain operating and maintenance effort.

German Patent Laying-Open Document 4,016,100 discloses a method and an apparatus for drying sewage sludge, wherein the sludge is provided into and conveyed through a column-like or silo-like container, while tempered drying air is flowed through the sewage sludge from the bottom to the top of the container. After it has flowed through the sewage sludge, the drying air, which has thus been heated and laden with moisture, is removed from the top of the container via an exhaust pipe by creating a negative pressure in this exhaust pipe by means of a blower. A filter is connected in circuit downstream from the blower in order to remove malodorous substances and the sewage decay gases from the exhaust gas before it is blown out into the surrounding environment. Even though this known sewage sludge dryer seems to be relatively simple in construction, its operation and the treatment of the dryer exhaust gases in order to produce an environmentally acceptable exhaust gas output stream requires a relatively high effort with regard to the necessary equipment and control technology, as well as operating and maintenance efforts. Furthermore, introduction of the drying air at the bottom of the silo-like container requires the use of high pressure blowers or air pumps, depending on the depth of the container and density of the sludge, which in turn requires a rather high energy input for pumping the drying air flow.

German Patent Laying-Open Document 4,013,761 discloses a method for drying pasty and/or particulate bulk materials such as sewage sludge, whereby the sewage sludge is piled onto an air permeable conveyor arrangement in the form of an air permeable heaped layer, which is conveyed through a drying apparatus by the conveyor apparatus. In the drying apparatus, a tempered drying gas flow is caused to flow alternately back and forth through the conveyor apparatus and the heaped layer of sewage sludge, in order to extract water from the sewage sludge. The resulting water-laden drying gas flow is sucked out of the drying apparatus and conveyed to a condenser in which the moisture is condensed out of the gas. The resulting condensate, which is predominately water, can be provided into a water treatment or clarifying plant. The known method apparently does not provide means for preventing the malodorous substances and sewage gases contained in the drying gas from entering and polluting the environment. Moreover, it would presumably be necessary to provide means for neutralizing the condensate extracted from the moisture-laden drying gas, in order to avoid further environmental contamination or equipment contamination by the condensate. The provision of such additional measures necessarily involves a further effort and expense with regard to equipment and control technology, as well as an additional operating and maintenance effort.

German Patent Laying-Open Document 3,923,020 discloses a method for the disposal processing of adhesive or sticky sludges, and particularly lacquer or paint residue sludges that contain environmentally harmful inorganic components that are volatile under the effect of heat. In the known method, the wet sticky sludge is applied onto a band of a substrate material, which is then conveyed through a drying furnace or oven, where the volatile components are dried out of the sludge. Thereby, the sludge is dried and adheres firmly onto the substrate material band to form a composite unit therewith. This composite unit may then be disposed of or recycled. On the other hand, the drying air that contains the moisture, solvents, and other volatile components that have been removed from the sticky sludge is introduced into a combustor and burned, in order to incinerate the dangerous or environmentally undesirable components such as the volatile inorganic components. This subsequent combustion step is expensive to carry out.

SUMMARY OF THE INVENTION

In view of the above, it is an object of the invention to provide a simplified method and system for treating the exhaust gas emitted from a thermal drying process such that the treated exhaust gas may be released into the atmosphere, and to avoid the need of separate steps of demoisturizing a circulating process gas and cleaning a regeneration gas that is conveyed in a separate regeneration cycle. The invention further aims to avoid or overcome the disadvantages of the prior art, and to achieve additional advantages, as apparent from the present description.

The above objects have been achieved in a method of drying a moisture-containing bulk material and of treating the resulting moisture-laden exhaust gas of the drying process, according to the invention. The method particularly involves a sludge drying process using a sewage sludge drying apparatus, in connection with an exhaust gas treatment using a waste water treatment plant. According to the invention, a drying gas is flowed through the sewage sludge in order to remove moisture from the sludge, except for a remaining residual moisture content, and the resultant moisture-laden gas is removed from the drying apparatus and introduced into the waste water in a waste water treatment plant. Especially, the moisture-laden gas is pumped or blown into the waste water by means of the aeration equipment of the waste water treatment plant, partially or entirely replacing the air that would normally be pumped into the waste water for aeration.

The above objects have further been achieved in an apparatus or system for carrying out the present method, according to the invention, including a sewage sludge dryer, and a waste water treatment plant including at least one waste water clarifying basin that is connected to the sewage sludge dryer by an air pipe or conduit for conveying the moisture-laden gas from the dryer into the waste water clarifying basin. Throughout this disclosure, the terms pipe, conduit, pipeline and the like shall be understood broadly to cover any pipe, conduit, duct, channel, hose, tube, or the like suitable for conveying a liquid or gas therein.

An essential feature of the invention is that the moisture-laden exhaust gas from the drying process is introduced into the waste water in a waste water treatment plant, whereby this waste water is preferably in its raw or un-clarified condition. To achieve this, the exhaust gas preferably has a temperature of less than 85° C. and it is conveyed into a waste water trough or sluice or a waste water basin having an adequate waste water volume such that the exhaust gas is cooled to the temperature of the waste water which is preferably less than 30° C., and the water soluble malodorous substances, such as ammonia or ammonium compounds, are dissolved and washed out of the exhaust gas.

The exhaust gas may be introduced into the waste water in various ways. Preferably, the exhaust gas is introduced into the waste water via an aerating device or aerating equipment provided in the waste water treatment plant, such that the exhaust gas bubbles through the waste water. The exhaust gas may either partially or entirely replace the air that is normally introduced into the waste water for aeration purposes. This is possible because the exhaust gas preferably includes a normal oxygen content of about 21%, which the normal atmospheric air contains as well.

The necessary waste water volume can be relatively low, and is readily achieved if the exhaust gas is introduced into the waste water basin at a depth of less than 1000 mm below the waste water surface level. The depth at which the exhaust gas is introduced into the waste water in any particular application depends on the balance between the aeration requirements and the energy consumption. Namely, as the exhaust gas is introduced into the waste water at a deeper level, the aeration effect is improved as the exhaust gas bubbles up through a greater distance in the waste water, but the energy consumption is increased because it is necessary to introduce the exhaust gas at a higher pressure into the waste water. Thus, by preferably limiting the gas introduction depth to less than 1000 mm, the use of energy intensive, high pressure aerator devices can be avoided.

Moreover, the inventive method and system completely avoid the necessity of additional equipment and additional process steps for condensing the moisture and other volatile components out of the exhaust gas and for cleaning the exhaust gas, with regard to both the equipment and the control technology. Namely, the already existing waste water clarifying basin or basins of a waste water treatment plant are advantageously and simply used for carrying out the cooling, condensing (i.e. drying), and cleaning of the exhaust gas from the sludge drying process. In this manner, the operator of the plant benefits from reduced operating and maintenance efforts and from reduced operating costs.

By introducing the tempered and moisture-laden exhaust gas into the waste water of a water treatment plant, the waste water treatment process is also advantageously affected. For example, certain components in the exhaust gas, such as the ammonia and ammonium compounds, as well as oxygen and the thermal energy of the exhaust gas, being introduced into the waste water serve to accelerate and stimulate the biological water clarification processes to a higher activity level. Since the same operating efforts and energy input are necessary for operating the water treatment plant in the normal manner using environmental air for aeration as for operating the plant according to the present invention using the moisture-laden exhaust gas for aeration, is essentially no additional cost or effort, while achieving the above mentioned advantages.

BRIEF DESCRIPTION OF THE DRAWING

In order that the invention may be clearly understood, it will now be described in connection with an example embodiment, with reference to the single accompanying drawing, which schematically shows a block diagram of a sludge drying and water treatment plant for carrying out the method according to the invention.

DETAILED DESCRIPTION OF PREFERRED EXAMPLE EMBODIMENTS AND OF THE BEST MODE OF THE INVENTION

The single drawing FIGURE represents both a schematic diagram of the equipment and a process flow diagram of the method according to the invention. The equipment includes a sewage sludge drying apparatus in combination with a water clarifying basin of a water treatment plant. A sewage sludge 2 having a dry solids content of approximately 20 wt. % is supplied into a supply silo 1. From the silo 1, the sewage sludge 2 is conveyed through a pipeline 3 to a supply and pelletizing apparatus 4 arranged at the input end of a through flow dryer 5. Specifically, the supply and pelletizing apparatus 4 communicates in a sealed manner into the first drying zone 6 of the plural successive drying zones 6, 7, 8 and 9 making up the through flow dryer 5. The sewage sludge 2 is pelletized by the pelletizing apparatus 4 and is fed, in pelletized form, onto an endless loop screen conveyor belt 10 running endlessly within the dryer 5. The screen conveyor belt 10 conveys the pelletized sewage sludge 2 in the transport direction 15 from the drying zone 6 through the successive drying zones 7 to 9 in a continuous throughflow process, and then transfers the dried sewage sludge 2 onto a discharge conveyor apparatus 11 at the opposite end of the dryer 5.

As it is transported through the dryer 5, the sewage sludge 2 is dried by a process gas 14 flowing through the dryer 5, as will be described in detail below. The dried sewage sludge 2 leaving the dryer 5 has a dry solids content of about 95 wt. %, i.e. a residual moisture content of about 5%. The discharge conveyor apparatus 11 transports the dried sewage sludge 2 into an outlet storage silo 12. From the silo 12, the dried sludge 2 may be removed as needed for disposal, further processing, or recycling. Furthermore, a conveyor line 13 may lead from the storage silo 12 back to the supply and pelletizing apparatus 4 in order to convey a portion of the dried sludge 2 back into the input material flow, in order to adjust the water content or other properties of the input sewage sludge.

The throughflow dryer 5 includes or is connected to the following additional equipment for drying the sewage sludge 2. Namely, to provide a process gas flow 14, atmospheric fresh air is sucked by a motor driven ventilator, such as a blower or fan for example, through a pipeline or conduit 20, through an intake filter 21 and a switching device 22 as well as a heater 24 arranged in series in the pipeline 20. Once the fresh air flow has been filtered, regulated and heated in this manner, it is provided as a process gas flow 14 into the final drying zone 9. The process gas 14 flows through the sewage sludge 2 on the air permeable screen conveyor belt 10, and then preferably flows successively from top to bottom through the successive drying zones 8, 7 and 6 in a pattern that is zone-wise opposed to the transport direction 15 of the sewage sludge 2. In this manner, using a staged pseudo-countercurrent drying flow, the driest possible condition of the sewage sludge 2 exiting the dryer 5 can be achieved. Finally, the moisture-laden process gas 14 leaves the dryer 5 from the first drying zone 6 in the form of a high moisture content process gas having a temperature in the range from about 60 to about 85° C.

The desired flow of the process gas 14 through the respective zones of the dryer 5 can be driven or carried out dependent on the particular pressure conditions developing within the different zones of the dryer 5. The necessary pressure difference can be provided simply by the supply ventilator 23, optionally in combination with the ventilator 19 that will be described below.

However, preferably, in order to provide a positive process gas transport in the desired flow direction and flow pattern, a respective ventilator 16, such as a motor driven blower or fan, is connected to each of the drying zones 6 to 9, to blow the process gas 14 into the respective zone through a respective supply pipe. A respective transfer pipe 20' connects the suction side of each ventilator 16 to the preceding drying zone in the gas flow direction, so as to withdraw the process gas 14 from the preceding zone and blow it into the next drying zone in the process gas flow direction. Zone partitions or baffles 50 preferably separate the interior space of the dryer 5 into the successive drying zones 6 to 9 so as to direct or constrain the process gas flow pattern as desired.

Finally, the moisture-laden process gas 14 is withdrawn from the first drying zone 6 through the pipeline 17 using a ventilator 19, such as a motor driven blower, fan or air pump. The pipeline 17 conveys the tempered and moisture-laden exhaust gas, i.e. the process gas 14, to a water clarifying basin 18 of a water treatment plant. The water clarifying basis 18 contains waste water 18A, that may be raw, untreated and un-clarified waste water. The moisture-laden process gas 14 is introduced, e.g. injected, into the waste water 18A through an aerator 18C, such as a pipe provided with aeration nozzles or orifices. Thus, the process gas 14 bubbles upward from the aerator 18C through the waste water 18A.

It is not necessary that the aerator 18C be arranged at the bottom of the basin 18. Advantageously, the aerator 18C or other process gas introduction equipment should be arranged less than 1000 mm below the surface level 18B of the waste water 18A. It has been determined to be particularly effective, and advantageous in view of reducing the necessary injection pressure while still achieving the necessary treatment of the gas, to introduce the process gas 14 into the waste water 18A at a depth of preferably 300 to 1000 mm below the surface 18B of the waste water. This provides sufficient interaction between the process gas 14 and the waste water 18A, while minimizing the injection pressure and thus the energy needed for pumping the process gas. In some applications, the ventilator 19 may be omitted, if the ventilators 23 and 16 provide a sufficient pressure for injecting the process gas into the waste water. It is also possible to introduce the process gas 14 at a greater depth into the waste water 18A, for example if the waste water treatment plant was previously already equipped for aeration at a greater depth.

As the process gas 14 bubbles up through the waste water 18A, the process gas is cooled and thoroughly mingled with the waste water 18A, whereby the moisture and any volatile components in the process gas 14 are condensed and dissolved out into the waste water 18A. The process gas 14 is thereby cooled, cleaned, demoisturized, and deodorized, so that the final resulting treated exhaust gas 14' may be exhausted directly to the atmosphere.

The inventive method and system achieves an advantageous reduction in the effort and expense of the necessary equipment and control technology, as well as the associated operating and maintenance efforts, as compared to previously known sewage sludge drying plants. Moreover, the inventive method and system can be used in connection with every type of sewage sludge drying plant, which emit exhaust process gases that are laden with moisture and organic substances. These organic substances can safely and beneficially be introduced into the waste water to be treated in a waste water treatment facility. Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of drying a moisture-containing bulk sewage sludge and treating a resulting moisture-laden gas, comprising the following steps:
   a) situating said moisture-containing bulk sewage sludge in a sludge drying apparatus;
   b) in said sludge drying apparatus, flowing a drying gas in contact with said bulk sewage sludge, whereby said drying gas takes up at least some moisture from said bulk sewage sludge to become a moisture-laden gas;
   c) providing raw unclarified sewage waste water contained in a waste water clarifying basin of a waste water treatment plant; and
   d) introducing said moisture-laden gas into said sewage waste water by injecting said moisture-laden gas into said sewage waste water in said clarifying basin through an aerator apparatus of said waste water treatment plant.

2. The method according to claim 1, wherein said aerator apparatus comprises a gas conveying pipe with a plurality of aeration orifices arranged in said sewage waste water, and said step d) comprises injecting said moisture-laden gas through said aeration orifices into said sewage waste water such that said moisture-laden gas bubbles up through said sewage waste water.

3. The method according to claim 1, wherein said aerator apparatus is arranged to introduce said moisture-laden gas into said sewage waste water at a depth of not more than 1000 mm below a surface level of said sewage waste water.

4. The method according to claim 1, wherein said step d) is carried out so as to introduce said moisture-laden gas into said sewage waste water at a depth of not more than 1000 mm below a surface level of said sewage waste water.

5. The method according to claim 4, wherein said depth is at least 300 mm below said surface level.

6. The method according to claim 4, wherein said depth is not at a bottom of said clarifying basin containing said sewage waste water, which has a maximum bottom depth of more than 1000 mm.

7. The method according to claim 1, wherein said sewage waste water has a temperature of less than 30° C. and said moisture-laden gas has a temperature in a range from 60° C. to 85° C. when said moisture-laden gas is introduced into said sewage waste water.

8. The method according to claim 1,
   wherein said drying gas further takes up at least one malodorous component from said bulk sewage sludge during said step b),
   wherein said moisture-laden gas comprises a gas, water vapor, and said at least one malodorous component,
   wherein said step d) comprises bubbling said moisture-laden gas through said sewage waste water,
   and wherein said moisture-laden gas is cooled, said water vapor is at least partially condensed out of said moisture-laden gas into said sewage waste water, and said malodorous component is at least partially removed from said moisture-laden gas into said sewage waste water during said step d), whereby said moisture-laden gas is converted to a cleaned gas.

9. The method according to claim 8, further comprising exhausting said cleaned gas from said sewage waste water directly to the atmosphere without additional processing after said step d).

10. The method according to claim 8, wherein said malodorous component comprises at least one organic compound.

11. The method according to claim 8, wherein said malodorous component comprises at least one of ammonia and ammonium compounds.

12. The method according to claim 1, further comprising a preliminary step of preparing said drying gas by filtering and heating atmospheric air, and wherein said flowing of said gas is positively driven by blowing said drying gas with at least one motor-driven ventilator.

13. The method according to claim 12, wherein said step b) further comprises conveying said bulk sewage sludge in a material transport direction, and wherein said flowing of said drying gas comprises flowing said drying gas through said bulk sewage sludge substantially perpendicularly to said material transport direction respectively in a plurality of drying zones in a succession of said drying zones proceeding opposite said material transport direction.

* * * * *

UNITED STATES PATENT AND TRADEMARK OFFICE
CERTIFICATE OF CORRECTION

PATENT NO. : 6,101,739

DATED : August 15, 2000

INVENTOR(S) : Rutz et al.

It is certified that error appears in the above-identified patent and that said Letters Patent is hereby corrected as shown below:

On the Title Page: under [73], Assignee:"
        line 1, after "Lindauer Dornier Gesellschaft" insert --mbH--.

Signed and Sealed this

Twenty-ninth Day of May, 2001

Attest:

NICHOLAS P. GODICI

Attesting Officer

Acting Director of the United States Patent and Trademark Office